June 20, 1933.   C. A. RUDQVIST   1,914,618
POWER TRANSMISSION MECHANISM
Filed Dec. 9, 1929
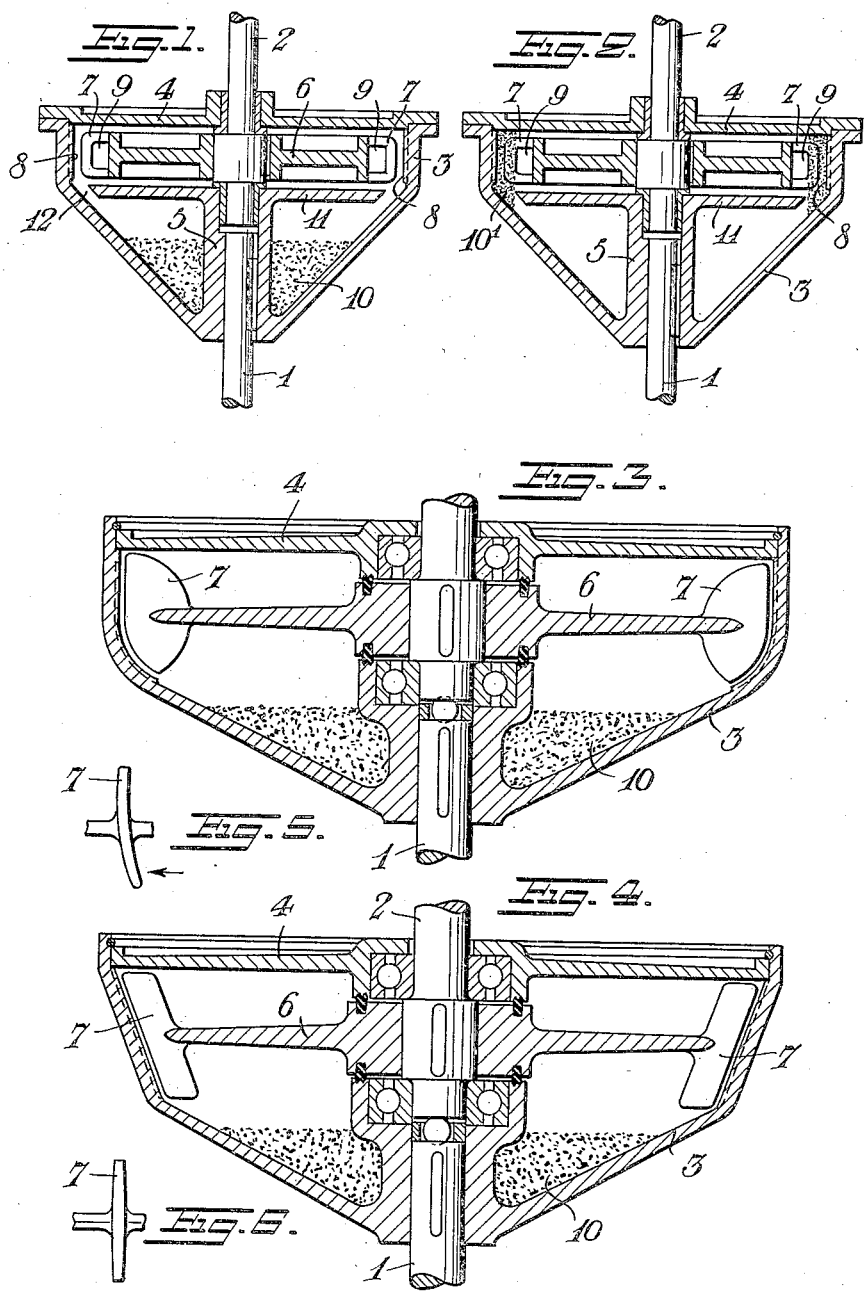
INVENTOR:
Carl August Rudqvist
By N. J. Nedland
HIS ATTORNEY Patented June 20, 1933

1,914,618

UNITED STATES PATENT OFFICE

CARL AUGUST RUDQVIST, OF STOCKHOLM, SWEDEN, ASSIGNOR TO PULVIS AKTIENGE-SELLSCHAFT, OF GLARUS, SWITZERLAND, A CORPORATION OF SWITZERLAND

POWER TRANSMISSION MECHANISM

Application filed December 9, 1929. Serial No. 412,661.

This invention relates to power transmitting mechanisms and particularly to that type of such mechanisms which comprises relatively rotatable coaxially mounted driving and driven members and a mass of finely divided material to effect transmission of power from the driving member to the driven member due to the rotation of the former while allowing a slip between the driving and the driven members as soon as the resistance of the driven member exceeds a predetermined value.

One object of the invention is to provide a power transmission mechanism of the above said type in which the power transmission medium is out of reach of the member to be driven when the mechanism is at rest but will be gradually moved into the path of the driven member due to the rotation of the driving member. As a result, the driving member will not be subjected to any resistance at all in starting. Moreover, an exceedingly smooth starting will be secured.

Another object is to provide a power transmission mechanism of the said type which is especially adapted for use in connection with vertical shafts, as, for instance for the driving of milk separators or the like.

One feature of the invention involves the provision of means to hold the finely divided power transmission medium out of the reach of the driven member when the mechanism is idle and cause it to gradually move into reach of the driven member due to rotation of the driving member.

This and other features will be more clearly set forth in the following description taken in conjunction with the accompanying drawing which illustrates several embodiments of the invention.

Referring to the drawing:

Fig. 1 is a vertical section of one embodiment of the invention with the powdered material shown in the position it occupies when the mechanism is at rest. Fig. 2 is a vetrical section of the same embodiment showing the powdered material in the position it occupies when the mechanism is in operation. Figs. 3 and 4 show vertical sections of two modified embodiments. Figs. 5 and 6 are views of the blades of the embodiments shown in Figs. 3 and 4, respectively.

With reference to Figs. 1 and 2, the numerals 1 and 2 indicate two vertical axially aligned shafts capable of rotation independently of each other. The lower shaft 1 carries a casing or drum 3 comprising an upper cylindrical portion closed at its top by a cover 4 and a lower downwardly tapering conical portion formed integral with a hub 5 secured to the shaft 1. Attached to the upper shaft 2 is a wheel or disc 6 having a number of blades 7 at its periphery. Said wheel or disc 6 is enclosed in the upper cylindrical portion of the drum 3 and its blades extend nearly to the inner cylindrical surface of the drum. Said inner cylindrical surface may preferably be formed with axially extending ribs or the like 8. The blades 7 are shown as formed with apertures 9.

The drum 3 is partially filled with a finely divided material, as a powdered or grainy mass, which may consist of powder or small balls of metal or other material either alone or mixed with a small amount of a dry lubricating or surface protecting substance, as graphite. In the idle position of the mechanism said material fills the lower conical portion of the drum 3 to part of the height thereof, as shown at 10 in Fig. 1. Below the disc or wheel 6 the hub 5 of the drum carries a disc 11 of such a diameter as to leave a narrow annular space 12 between its periphery and the inner surface of the drum.

In the idle position of the mechanism, that is, with the driving shaft 1 at rest, the powdered material will be in the position shown in Fig. 1, that is to say, it will be enclosed in the conical portion of the drum below the disc 11. In this position the driving and driven shafts 1 and 2 are entirely free of each other. When the driving shaft 1 is caused to rotate, this rotation will, to begin with, have no effect at all upon the blade wheel 6. Thus, the driven shaft will present no resistance to the rotation of the driving shaft at the starting moment. As the speed of the driving shaft increases, the powdered material will be caused, due to the centrifugal force, to ascend along the conical wall of the drum 3 to enter the cylindrical upper portion of the drum through the annular passage 12. The powdered material will gradually enter into the path of the blades 7, as indicated at 10' in Fig. 2, so as to form an annular layer around the inner cylindrical surface of the drum. The blades 7, when engaging the powdered material, will cause it to collect as a drift in front of each of them. Due to the centrifugal force the density of said drifts will increase thereby causing the blades to rotate at a gradually increasing speed which will, after a certain period of time, be equal that of the driving drum 3.

The period of time from the starting moment to the moment at which the driven member reaches the speed of the driving member, which may be termed the "starting period", may be determined for a given powdered material and a given speed of rotation of the driving member by determining the inclination of the wall of the lower conical portion of the drum and the area of the annular passage 12.

The apertures 9 formed in the blades will allow the powdered material to travel from one side of the blade to the other, should unbalance exist between the amounts of powder adjacent the blades causing the clutch to vibrate when in operation. The movement of the powder owing to such vibration will take place automatically until balance is restored.

The embodiment shown in Fig. 3 comprises likewise a casing or drum, including an upper substantially cylindrical portion and a lower conical portion, and a blade carrying disc or wheel 6 enclosed in the upper portion of said drum. The casing or drum and the disc or wheel are secured to independently rotatable vertical shafts 1 and 2, as shown. The casing is closed at its top by a cover 4. The blades 7 of the disc 6 are curved substantially somewhat as the blades of a propeller, as shown in Fig. 5, the convex side of the blades being adapted to be directed in the direction of rotation of the drum, as shown by the arrow in Fig. 5. The powdered material 10 is enclosed in the lowermost conical portion of the drum when at rest. In this embodiment there is no wall as 11 (Fig. 1), the lower portion of the drum being in entirely free communication with the upper portion of the drum. In the rotation of the driving member or drum 3 the powdered material will be caused due to the centrifugal force to ascend along the conical surface of the drum up into the path of the blades 7 and will collect as a drift on the concave side of each blade. Said drifts when packed sufficiently due to the centrifugal force will take the blades with them, causing the disc or wheel 6 together with the shaft 2 to rotate.

In this embodiment the curved shape of the blades has for its object to effect a suitable distribution of the powdered mass on the operative surfaces of the blades.

In Fig. 4 another method of obtaining a suitable distribution of the powdered material on the operative surfaces of the blades is illustrated.

This embodiment differentiates from that shown in Fig. 3 only by the fact that the upper portion of the drum 3 is conical, though with a more acute angle of cone than that of the lower portion of the drum. The outer edges of the blades 7 are correspondingly inclined, as shown. In this case, however, the blades extend in axial planes. The operation is similar to that above described.

It is to be noted that when the driven blade wheel of any of the embodiments above described exerts a resistance to the rotation which is sufficiently high to overcome the action of the drifts of powdered material on the blades, a sliding effect will be caused to take place within the powdered mass, allowing the driven wheel to rotate at a velocity below that of the driving drum.

It will be understood that the invention may be embodied in other structures than those illustrated and described.

What I claim is:

1. A clutch comprising an outer driving member, an inner driven member, said driving member comprising a casing forming a chamber having vertical extent, said driven member comprising blades rotatably mounted coaxially with respect to said casing and within said chamber adjacent to the upper part of the casing, and a quantity of finely divided solid material partially filling said chamber for transmitting power from said driving member to said driven member, the lower part of said chamber providing a space for retaining said material out of reach of the driven member when the clutch is at rest, the interior of said casing adjacent to said blades having a substantially circular cross-section providing for unobstructed movement of said material with respect to said driving member to form drifts of said material in front of said blades upon rotation of said driving member.

2. A clutch comprising an outer driving member, an inner driven member, said driving member comprising a casing forming a chamber having vertical extent, said driven member comprising blades rotatably mounted coaxially with respect to said casing and within said chamber adjacent to the upper part of the casing, and a quantity of finely divided solid material partially filling said chamber for transmitting power from said driving member to said driven member, the lower part of said chamber providing a space for retaining said material out of reach of the driven member when the clutch is at rest, the interior of said casing adjacent to said blades presenting a substantially cylindrical surface providing for unobstructed movement of said material with respect to said driving member to form drifts of said material in front of said blades upon rotation of said driving member.

3. A clutch comprising an outer driving member, an inner driven member, said driving member comprising a casing forming a chamber having vertical extent, said driven member comprising blades rotatably mounted coaxially with respect to said casing and within said chamber adjacent to the upper part of the casing, and a quantity of finely divided solid material partially filling said chamber for transmitting power from said driving member to said driven member, the lower part of said chamber providing a space for retaining said material out of reach of the driven member when the clutch is at rest, the interior of said casing adjacent to said blades presenting a substantially conical surface providing for unobstructed movement of said material with respect to said driving member to form drifts of said material in front of said blades upon rotation of said driving member.

4. A clutch comprising an outer driving member, an inner driven member, said driving member comprising a casing forming a chamber having vertical extent, said driven member comprising blades rotatably mounted coaxially with respect to said casing and within said chamber adjacent to the upper part of the casing, and a quantity of finely divided solid material partially filling said chamber for transmitting power from said driving member to said driven member, the lower part of said chamber providing a space for retaining said material out of reach of the driven member when the clutch is at rest, the interior of said casing adjacent to said blades presenting substantially a surface of revolution providing for unobstructed movement of said material with respect to said driving member to form drifts of said material in front of said blades upon rotation of said driving member.

5. A clutch comprising an outer driving member, an inner driven member, said driving member comprising a casing forming a chamber having vertical extent, said driven member comprising blades rotatably mounted coaxially with respect to said casing and within said chamber adjacent to the upper part of said casing, and a quantity of finely divided solid material partially filling said chamber for transmitting power from said driving member to said driven member, the lower part of said chamber being formed with upwardly and outwardly inclined inner surface and providing a space for retaining said material out of reach of the driven member when the clutch is at rest, the interior of said casing adjacent to said blades having a substantially circular cross-section providing for unobstructed movement of said material with respect to said driving member to form drifts of said material in front of said blades upon rotation of said driving member.

6. A clutch comprising an outer driving member, an inner driven member, said driving member comprising a casing forming a chamber having vertical extent, said driven member comprising blades rotatably mounted coaxially with respect to said casing and within said chamber adjacent to the upper part of said casing, and a quantity of finely divided solid material partially filling said chamber for transmitting power from said driving member to said driven member, the lower part of said casing being in the form of an inverted cone and providing a space for retaining said material out of reach of the driven member when the clutch is at rest, the interior of said casing adjacent to said blades having a substantially circular cross-section providing for unobstructed movement of said material with respect to said driving member to form drifts of said material in front of said blades upon rotation of said driving member.

7. A clutch comprising an outer driving member, an inner driven member, said driving member comprising a casing forming a chamber having vertical extent, said driven member comprising curved blades having a concave surface rotatably mounted coaxially with respect to said casing and within said chamber adjacent to the upper part of the casing, and a quantity of finely divided solid material partially filling said chamber for transmitting power from said driving member to said driven member, the lower part of said chamber providing a space for retaining said material out of reach of the driven member when the clutch is at rest, the interior of said casing adjacent to said blades having a substantially circular cross-section providing for unobstructed movement of said material with respect to said driving member to form drifts of said material against the concave surface of said blades upon rotation of said driving member.

8. A clutch comprising an outer driving member, an inner driven member, said driving member comprising a casing forming a chamber having vertical extent, said driven member comprising curved blades having a concave surface rotatably mounted coaxially with respect to said casing and within said chamber adjacent to the upper part of the casing, and a quantity of finely divided solid material partially filling said chamber for transmitting power from said driving member to said driven member, the lower part of said chamber being formed with upwardly and outwardly inclined inner surface and providing a space for retaining said material out of reach of the driven member when the clutch is at rest, the interior of said casing adjacent to said blades having a substantially circular cross-section providing for unobstructed movement of said material with respect to said driving member to form drifts of said material against the concave surface of said blades upon rotation of said driving member.

9. A clutch comprising an outer driving member, an inner driven member, said driving member comprising a casing forming a chamber having vertical extent, said driven member comprising blades rotatably mounted coaxially with respect to said casing and within said chamber adjacent to the upper part of the casing, a quantity of finely divided solid material partially filling said chamber for transmitting power from said driving member to said driven member, the lower part of said chamber providing a space for retaining said material out of reach of the driven member when the clutch is at rest, and a disc-like partition member between the lower and upper parts of said chamber and providing restricted communication between said lower and upper parts adjacent to said casing for restricting passage of said material, the interior of said casing adjacent to said blades having a substantially circular cross-section providing for unobstructed movement of said material with respect to said driving member to form drifts of said material in front of said driving member.

In testimony whereof I have signed my name.

CARL AUGUST RUDQVIST.